United States Patent
Son et al.

(10) Patent No.: US 7,767,276 B2
(45) Date of Patent: Aug. 3, 2010

(54) LIQUID CRYSTAL COMPOSITION AND LIQUID CRYSTAL DISPLAY INCLUDING THE SAME

(75) Inventors: Jong-Ho Son, Seoul (KR); Fusayuki Takeshita, Seoul (KR); Jae-Jin Lyu, Yongin (KR); Yong-Kuk Yun, Suwon-si (KR); Hyun-Wuk Kim, Yongin (KR); Jang-Hyun Kim, Seoul (KR); Min-Goo Seok, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 399 days.

(21) Appl. No.: 11/556,910

(22) Filed: Nov. 6, 2006

(65) Prior Publication Data

US 2007/0272897 A1    Nov. 29, 2007

Related U.S. Application Data

(60) Provisional application No. 60/808,715, filed on May 25, 2006.

(30) Foreign Application Priority Data

May 25, 2006    (KR)    ...................... 10-2006-0047071

(51) Int. Cl.
  C09K 19/34    (2006.01)
  C09K 19/32    (2006.01)
  C09K 19/30    (2006.01)
  G02F 1/13     (2006.01)

(52) U.S. Cl. .............. 428/1.1; 252/299.61; 252/299.62; 252/299.63

(58) Field of Classification Search ................. 428/1.1, 428/1.3; 252/299.61, 299.62, 299.63
See application file for complete search history.

(56) References Cited

U.S. PATENT DOCUMENTS

| 7,226,644 | B2 * | 6/2007 | Matsumoto et al. | ........... 428/1.3 |
| 7,247,355 | B2 * | 7/2007 | Sagou et al. | ................. 428/1.1 |
| 7,429,411 | B2 * | 9/2008 | Sugiura et al. | ............... 428/1.1 |
| 7,662,442 | B2 * | 2/2010 | Nagashima | ................. 428/1.1 |
| 2005/0247910 | A1 * | 11/2005 | Sugiura et al. | ......... 252/299.61 |
| 2008/0138542 | A1 * | 6/2008 | Son et al. | ..................... 428/1.3 |
| 2008/0268181 | A1 * | 10/2008 | Takeshita et al. | ............. 428/1.5 |

FOREIGN PATENT DOCUMENTS

| EP | 1491612 | * | 12/2004 |
| JP | 2005281560 | * | 10/2005 |
| WO | WO-2005000995 | * | 1/2005 |

* cited by examiner

*Primary Examiner*—Shean C Wu
(74) *Attorney, Agent, or Firm*—H.C. Park & Associates, PLC

(57) ABSTRACT

The present invention discloses a liquid crystal composition having a first class compound including a fluorine-containing compound, and a second class compound including a neutral liquid crystal compound, where each terminal group of the neutral crystal compound includes an alkyl group, an alkoxy group, or an alkenyl group. If the neutral liquid crystal compound includes an alkenyl group at the terminal group, the liquid crystal composition includes less than 7 wt % of the neutral crystal compound including the alkenyl group. The present invention also discloses a liquid crystal display including the aforementioned liquid crystal composition.

14 Claims, 5 Drawing Sheets

LIQUID CRYSTAL COMPOSITION AND LIQUID CRYSTAL DISPLAY INCLUDING THE SAME

CROSS-REFERENCE TO RELATED APPLICATIONS

This application claims priority from and the benefit of Korean Patent Application No. 10-2006-0047071, filed on May 25, 2006, and provisional Patent Application No. 60/808,715 filed on May 25, 2006, which are hereby incorporated by reference for all purposes as if fully set forth herein.

BACKGROUND OF THE INVENTION

1. Field of the Invention

The present invention relates to a liquid crystal composition and a liquid crystal display including the same.

2. Description of the Background

A liquid crystal display (LCD) is one of the most widely used flat panel displays. Generally, a LCD includes two display panels on which field generating electrodes are formed and a liquid crystal layer interposed between the two display panels. A voltage is applied to the field generating electrodes to generate an electric field in the liquid crystal layer to determine the direction of liquid crystal molecules in the liquid crystal layer and to adjust the transmittance of light passing through the liquid crystal layer.

In the LCD, a liquid crystal is very important for adjusting the transmittance of light in producing a desired image. Because LCDs are used for various purposes, LCDs should have various characteristics, such as low voltage driving, a high voltage holding ratio (VHR), a wide viewing angle, a wide operational temperature range, and a high response speed.

In order to provide these various characteristics, a liquid crystal layer may include a liquid crystal composition that is composed of many kinds of liquid crystal components.

In addition to the liquid crystal composition, the liquid crystal layer may also contain a large amount of ion impurities. The ion impurities may be laterally transported along the electric field generated on the liquid crystal layer and concentrated at a particular region, such as the boundary of the field generating electrodes. In this case, the region at which the ion impurities concentrate may be recognized as a residual image by a viewer.

The above information disclosed in this Background section is only for enhancement of understanding of the background of the invention and therefore it may contain information that does not form the prior art that is already known in this country to a person of ordinary skill in the art.

SUMMARY OF THE INVENTION

This invention provides a liquid crystal composition for improving the residual image characteristic of a liquid crystal display.

This invention also provides a liquid crystal display including a liquid crystal composition.

Additional features of the invention will be set forth in the description which follows, and in part will be apparent from the description, or may be learned by practice of the invention.

A liquid crystal composition according to an exemplary embodiment of the present invention includes a first class comprising a fluorine-containing compound represented by the following chemical formula (I)

The liquid crystal composition further includes a second class comprising at least one neutral liquid crystal compound selected from a group consisting of the compounds represented by the following chemical formula (III), chemical formula (IV), and chemical formula (V).

At least one of $W_1$ and $W_2$ may include a fluorine atom. Each of A and B may include at least one selected from a group consisting of a chain or ring alkyl group and alkoxy group. The neutral liquid crystal compounds represented by the chemical formula (III), the chemical formula (IV), and the chemical formula (V) may have $R_1$ to $R_6$ as a terminal group, where each of $R_1$ to $R_6$ is one of a $C_1$ to $C_{12}$ alkyl group, an alkoxy group, and an alkenyl group. Assuming that among the second class, a neutral liquid crystal compound not having an alkenyl group at the terminal group is a first sub-class and that a neutral liquid crystal compound having an alkenyl group at the terminal group is a second sub-class, the second sub-class may be contained at less than 7 wt % of the total content of the first and second classes, or the second class may not include the neutral liquid crystal compound having an alkenyl group at the terminal group.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative size of layers and regions may be exaggerated for clarity. Like reference numerals in the drawings denote like elements.

It will be understood tbat when an element such as a layer, film, region or substrate is referred to as being "on" or "connected to" another element or layer, it can be directly on or directly connected to the other element or layer, or intervening elements or layers may also be present. In contrast, when an element is referred to as being "directly on" or "directly connected to" another element or layer, there are no intervening elements or layers present.

A liquid crystal composition according to an exemplary embodiment of the present invention will now be explained.

The liquid crystal composition may include many kinds of liquid crystals that differ from each other in physical characteristics.

A liquid crystal includes a core group forming a central axis and a terminal group or a lateral group connected to the core group.

The core group may include a phenyl group, a cyclohexyl group, and a cyclic compound selected from heterocycles.

The terminal group or lateral group may include a nonpolar group, such as an alkyl group, an alkoxy group, and an alkenyl group; and a polar group including a fluorine atom. The physical characteristics of the liquid crystal depend on the terminal group or lateral group.

The liquid crystal composition according to an exemplary embodiment of the present invention includes a fluorine-containing compound having dielectric anisotropy and a neutral compound without dielectric anisotropy.

The fluorine-containing compound may be represented by the following chemical formula (I)

(I)

Herein, at least one of $W_1$ and $W_2$ includes a fluorine atom, and each of A and B includes at least one selected from the group consisting of a chain or ring allyl group and a chain or ring alkoxy group.

For example, chemical formula (I) may be represented by chemical formula (VI)

(VI)

Herein, each of $W_1$ and $W_2$ is one selected from the group consisting of —F, —$CF_3$, —$CF_2H$, —$OCF_3$, and —$OCF_2H$, independently. Each of $R_7$ and $R_8$ is one selected from the group consisting of a hydrogen atom and an alkyl group or an alkoxy group having $C_1$ to $C_{12}$, independently. Each of $A_1$, $A_2$, $B_1$, and $B_2$ is one selected from the group consisting of trans-1,4-cyclohexylene, 1,4-phenylene, 1,4-cyclohexenylene, 1,4-bicyclo[2,2,2]ocetylene, piperidine-1,4-diyl, naphthalene-2,6-diyl, decahydronaphthalene-2,6-diyl, and 1,2,3,4-tetrahydronaphthalene-2,6-diyl, independently. Each of $Z_1$, $Z_2$, $Z_3$, and $Z_4$ is one selected from the group consisting of —$CH_2CH_2$—, —CH=CH—, —$CH(CH_3)CH_2$—, —$CH_2CH(CH_3)$—, —$CH(CH_3)CH(CH_3)$, —$CF_2CF_2$—, —CF=CF—, $CH_2O$—, —$OCH_2$—, —$OCH(CH_3)$—, —$CH(CH_3)O$—, —$(CH_2)_4$—, —$(CH_2)_3O$—, —$O(CH_2)_3$—, $CF_2O$—, —$OCF_2$—, —COO—, and —OCO—, independently. Each of a, b, c, and d is an integer of 0 or 1, independently.

The compounds belonging to the aforementioned groups may be compounds represented by the following formulas

-continued

The fluorine-containing compound may further include a compound represented by chemical formula (II)

(II)

Herein, at least one of $W_1$, $W_2$, and $W_3$ includes a fluorine atom, and each of C and D may include at least one selected from the group consisting of a chain or ring alkyl group and a chain or ring alkoxy group.

For example, chemical formula (II) may be represented by chemical formula (VII)

(VII)

Herein, each of $W_1$, $W_2$, and $W_3$ is one selected from the group consisting of —F, —$CF_3$, —$CF_2H$, —$OCF_3$, and —$OCF_2H$, independently. Each of $R_9$ and $R_{10}$ is one selected from the group consisting of a hydrogen atom and an alkyl group or an alkoxy group having $C_1$ to $C_{12}$, independently. Each of $C_1$, $C_2$, $D_1$, and $D_2$ is one selected from the group consisting of trans-1,4-cyclohexylene, 1,4-phenylene, 1,4-cyclohexenylene, 1,4-bicyclo[2,2,2]ocetylene, piperidine-1,4-diyl, naphthalene-2,6-diyl, decahydronaphthalene-2,6-diyl, and 1,2,3,4-tetrahydronaphthalene-2,6-diyl, independently. Each of $Z_5$, $Z_6$, $Z_7$, and $Z_8$ is one selected from the group consisting of —$CH_2CH_2$—, —CH=CH—, —CH($CH_3$)$CH_2$—, —$CH_2CH(CH_3)$—, —CH($CH_3$)CH($CH_3$), —$CF_2CF_2$—, —CF=CF—, $CH_2O$—, —$OCH_2$—, —OCH($CH_3$)—, —CH($CH_3$)O—, —$(CH_2)_4$—, —$(CH_2)_3O$—, —$O(CH_2)_3$—, $CF_2O$—, —$OCF_2$—, —COO—, and —OCO—, independently. Each of e, f, g, and h may be an integer of 0 or 1, independently.

The compounds belonging to the aforementioned groups may be compounds represented by the following formulas

The liquid crystal composition may include about 20 to about 80 wt % of the aforementioned fluorine-containing compounds.

Among these compounds, the liquid crystal composition preferably includes about 5 to about 40 wt % of the compound represented by chemical formula (I). If the liquid crystal composition includes less than about 5 wt % of the compound represented by chemical formula (I), the dielectric anisotropy of the liquid crystal composition may deteriorate. On the other hand, if the liquid crystal composition includes more than about 40 wt % of the compound represented by the chemical formula (I), a phase transition temperature, Tni, may change causing crystallization in the liquid crystal layer.

The liquid crystal composition may include less than about 40 wt % of the compound represented by chemical formula (II). If the liquid crystal composition includes more than about 40 wt % of the compound represented by chemical formula (II), a phase transition temperature, Tni, may change causing crystallization in the liquid crystal layer.

The neutral compound may include at least one compound selected from the group consisting of compounds represented by chemical formulas (III), (IV), and (V)

Herein, each of $R_1$ to $R_6$ may be the same or different from one another and may be an alkyl group or an alkoxy group having $C_1$ to $C_5$.

Preferably, each of $R_1$ to $R_6$ does not include an alkenyl group. If at least one of $R_1$ to $R_6$ includes an alkenyl group, the liquid crystal composition should include less than about 7 wt % of the neutral compound having the alkenyl group.

Otherwise, the liquid crystal composition may include about 20 to about 80 wt % of the neutral compound.

Among these compounds, the liquid crystal composition may contain about 10 to about 45 wt % of the compound represented by chemical formula (III), about 10 to about 45 wt % of the compound represented by chemical formula (IV), and about 0 to about 20 wt % of the compound represented by chemical formula (V).

As described above, according to an exemplary embodiment of the present invention, the liquid crystal composition may not include a neutral compound having an alkenyl group at the terminal group. Otherwise, the liquid crystal composition includes less than about 7 wt % of the neutral compound having the alkenyl group at the terminal group.

If an alkenyl group is included at the terminal group of the neutral compound, the double-bond position of the alkenyl group may be the reaction site of the ion impurities. Accordingly, the ion impurities may bond to the terminal group of the neutral compound and remain even after manufacturing of the liquid crystal composition is completed. Such ion impurities may be laterally transported along an electric field that is generated on the liquid crystal layer for driving the liquid crystal display and may concentrate on a particular region, such as the boundary of field generating electrodes. When the ion impurities bond to liquid crystal molecules, a line residual image may be produced because a refractive anisotropy changes.

The present invention can reduce the reaction with ion impurities by limiting the content of a neutral compound having an alkenyl group at the terminal group, thereby reducing the change of the refractive anisotropy of the liquid crystal composition caused by the ion impurities and improving a line residual image characteristic.

A line residual image can be estimated as follows.

First, test displays are prepared. Each test display includes two panels on which field generating electrodes are formed and a liquid crystal layer interposed between the two panels. A plurality of pixels is disposed in the test display. Among the plurality of pixels, a portion of pixels, alternately horizontally and vertically disposed, are represented with black, while another portion of pixels are represented with white to create latticed black/white patterns. Next, after a predetermined time, the black/white patterns are removed, leaving line-shaped stains at the boundaries of respective pixels while changing the whole test display with uniform gray levels from black to white. The elapsed time for the formation of a line-shaped stain is measured (hereinafter, referred to as the line residual image revelation time). The line residual image revelation time is a standard for indicating how long the LCD can be driven without the formation of a line residual image. Higher line residual image revelation time means a much better line residual image characteristic.

Five test displays were prepared. Each test display contained a liquid crystal composition including 0 wt %, about 7 wt %, and about 45 wt % of a neutral compound having an alkenyl group at the terminal group to determine the line residual image estimation in the aforementioned manner.

As a result, the test display containing the liquid crystal composition without a neutral compound having an alkenyl group at the terminal group (0 wt %) exhibited no line residual image even after about 1200 hours. Whereas, the line residual image revelation time for the test displays with a liquid crystal composition having about 7 wt % and about 45 wt % of the neutral compound was about 920 hours and about 420 hours, respectively.

Accordingly, the revelation degree of line residual images varies with the amount of neutral compound having the alkenyl group at the terminal group in the liquid crystal composition. A liquid crystal composition having less than about 7 wt % of the neutral compound may exhibit more than about 900 hours of line residual image revelation time. Further, a liquid crystal composition without a neutral compound having an alkenyl group at the terminal group may exhibit the maximum line residual image revelation time.

Also, the liquid crystal composition according to an exemplary embodiment of the present invention may further include at least one of liquid crystal compounds represented by chemical formulas (VIII) and (IX).

Herein, each of $R_{11}$, $R_{12}$, $R_{13}$, and $R_{14}$ is one selected from the group consisting of a hydrogen atom and an alkyl group or an alkoxy group having $C_1$ to $C_{12}$. The liquid crystal compounds represented by chemical formulas (VIII) and (IX) play a role to lower the viscosity of the liquid crystal composition instead of the neutral compound when the content of the neutral compound having an alkenyl group at the terminal group is limited.

The liquid crystal compound preferably includes less than about 10 wt % of the compounds represented by chemical formulas (VIII) and (IX).

Also, the liquid crystal composition according to an exemplary embodiment of the present invention has a high line residual image revelation time as described above and simultaneously provides a satisfactory dielectric anisotropy, refractive anisotropy, and rotation viscosity.

More specifically, the liquid crystal composition having positive dielectric anisotropy has a dielectric anisotropy of about +3 to about +20, a refractive anisotropy of about 0.060 to about 0.180, and a rotation viscosity of about 50 to about 250 mPa·s. Whereas, a liquid crystal composition having negative dielectric anisotropy has a dielectric anisotropy of about −2.7 to about −5.8, a refractive anisotropy of about 0.075 to about 0.109, and a rotation viscosity of about 87 to about 165 mPa·s.

A LCD according to an exemplary embodiment of the present invention will now be described in detail with reference to FIG. 1, FIG. 2, FIG. 3, FIG. 4, and FIG. 5.

Figure 1:
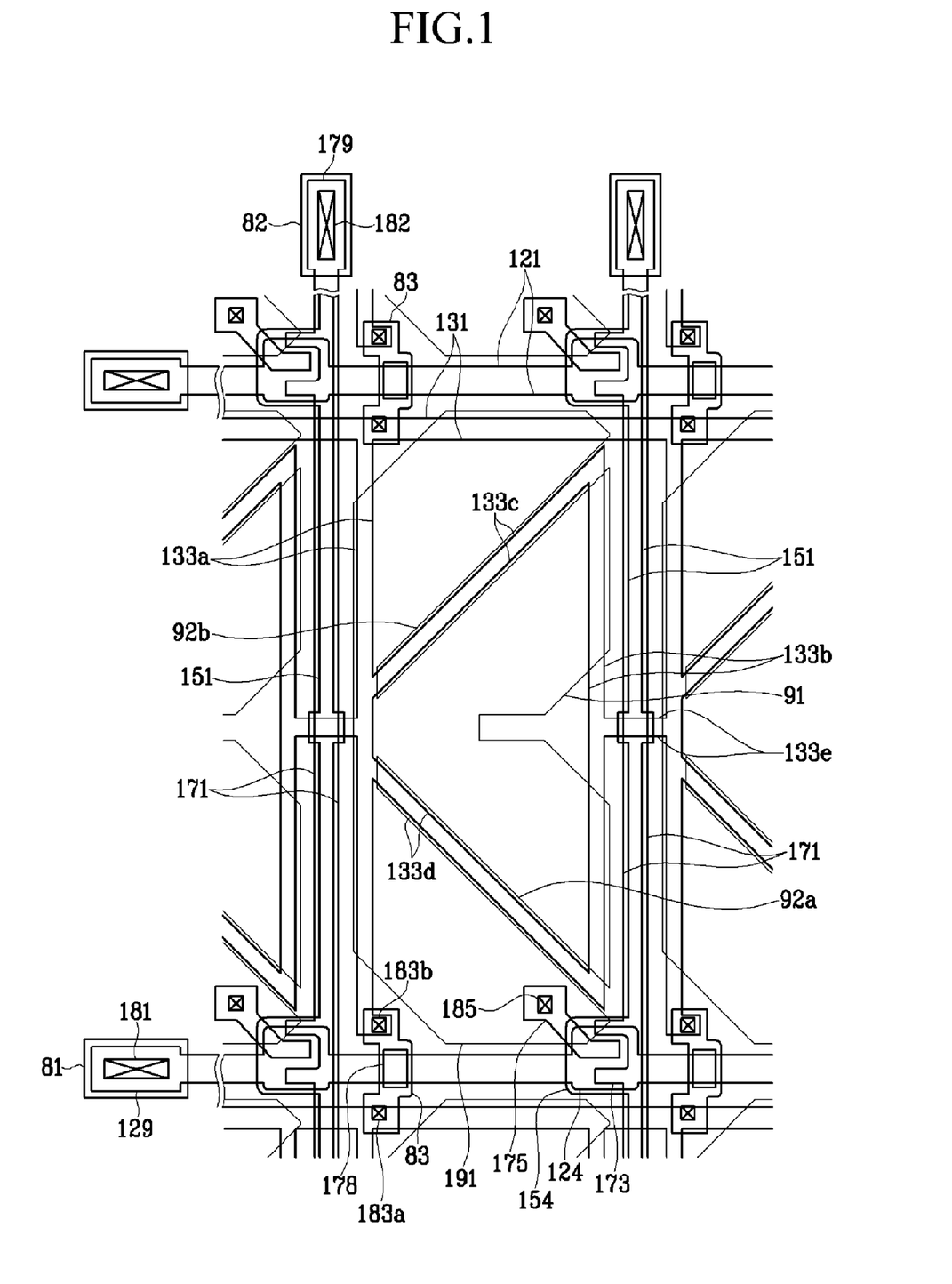
FIG. 1 illustrates a layout view of a thin film transistor array panel for a LCD according to an exemplary embodiment of the present invention.
Figure 2:
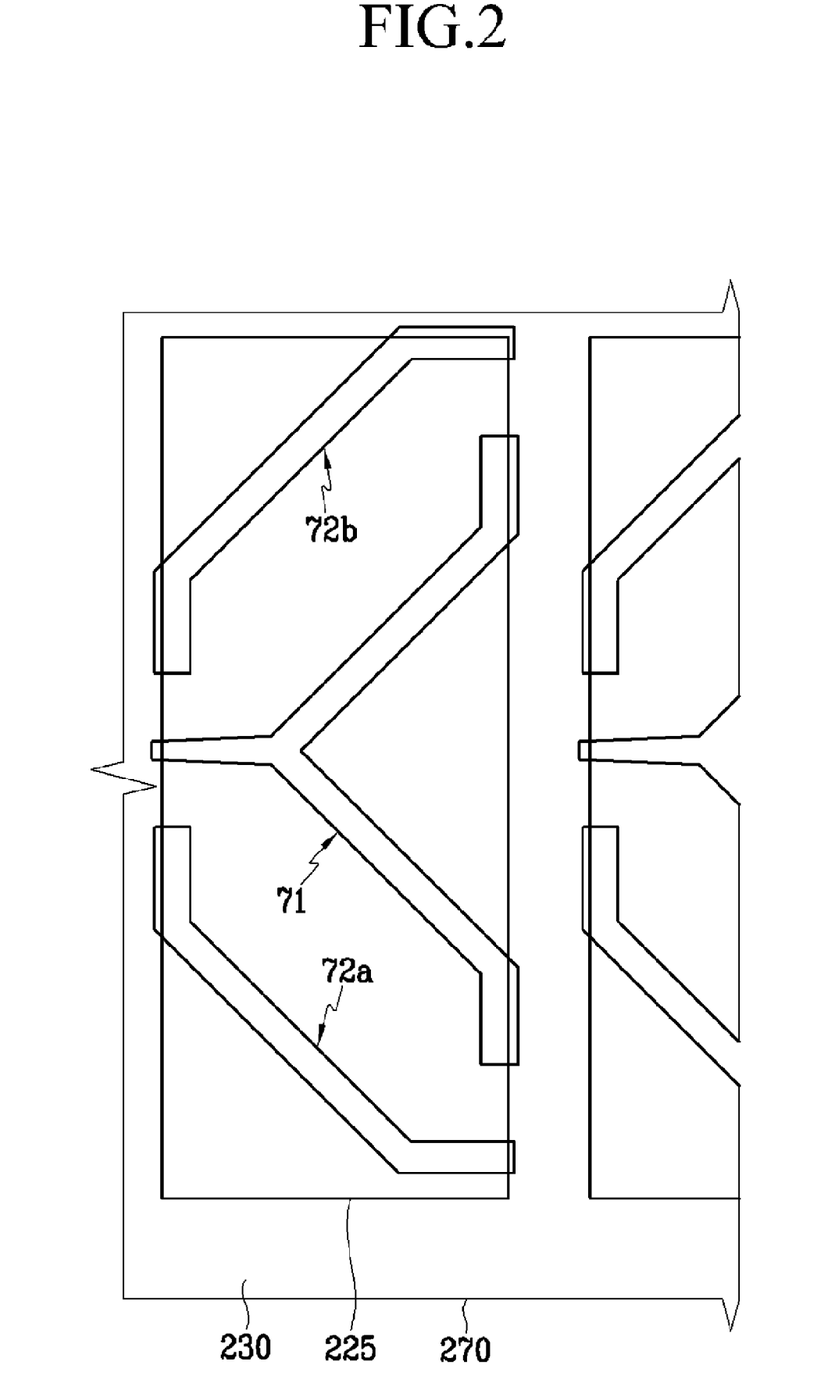
FIG. 2 illustrates a layout view of a common electrode panel for a LCD according to an exemplary embodiment of the present invention.
Figure 3:
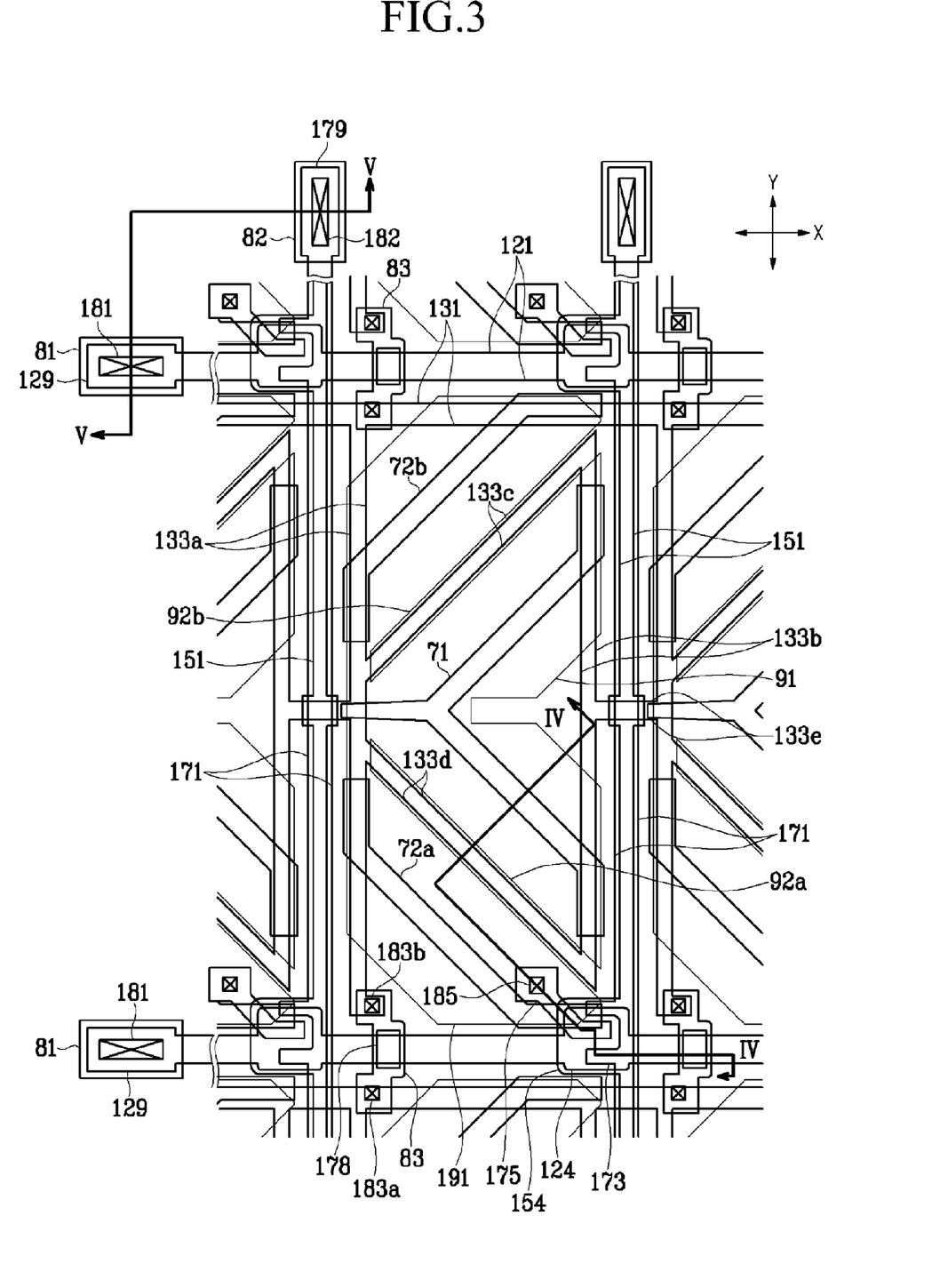
FIG. 3 illustrates a layout view of a LCD including the thin film transistor array panel of FIG. 1 and the common electrode panel of FIG. 2.
Figure 4:
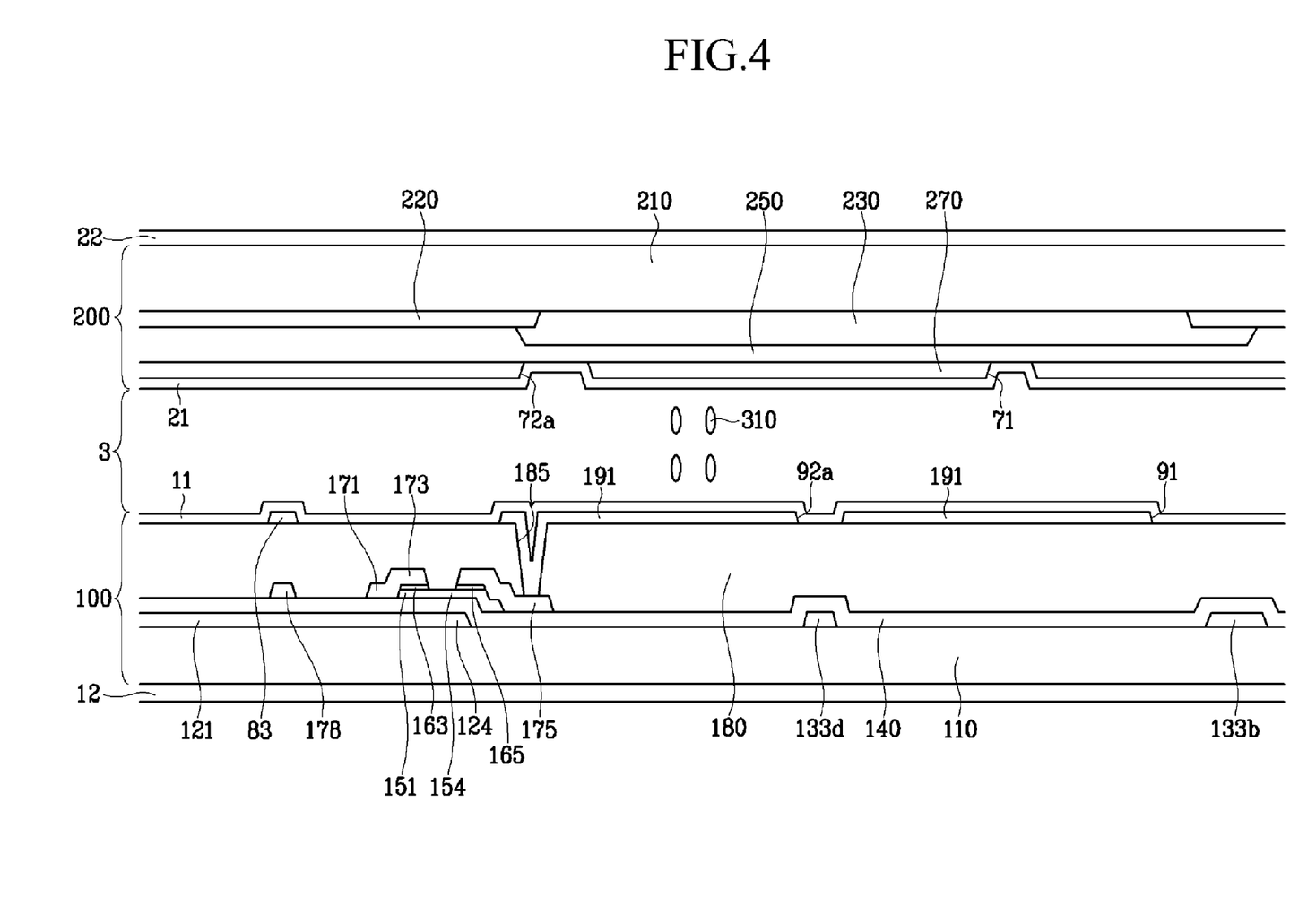
FIG. 4 and FIG. 5 illustrate cross-sectional views of the LCD taken along lines IV-IV and V-V of FIG. 3, respectively.
Figure 5:
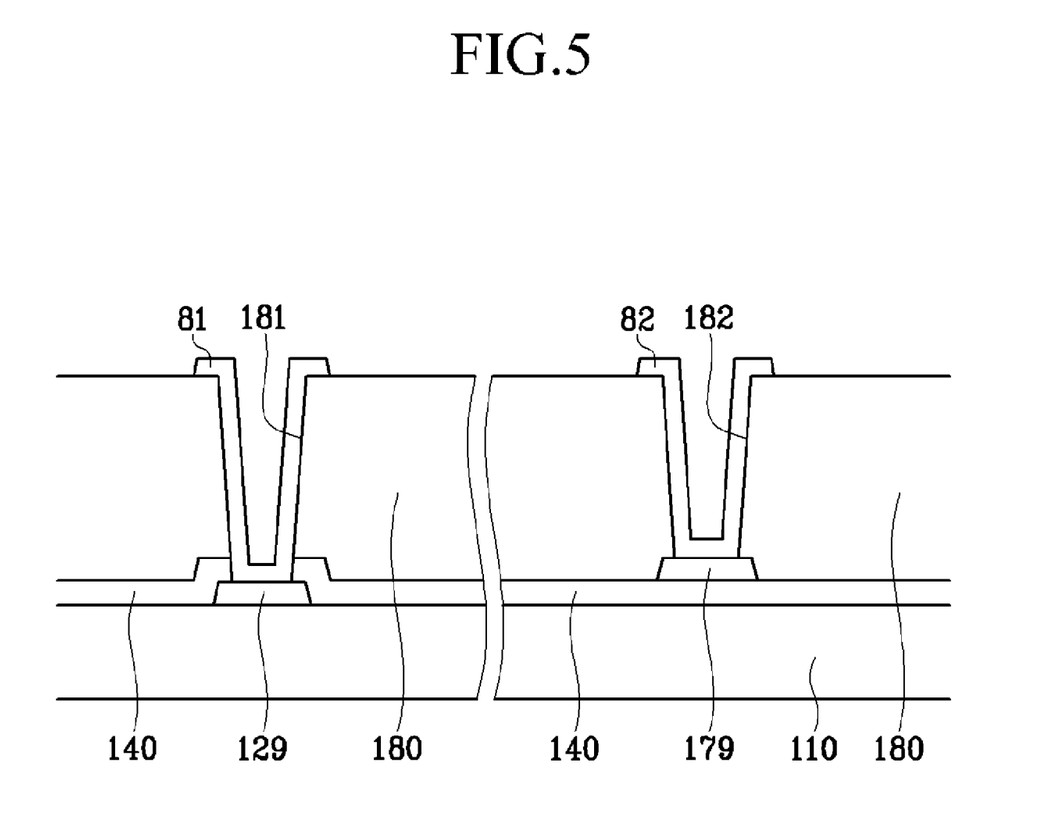

FIG. 1 illustrates a layout view of a thin film transistor array panel for a LCD according to an exemplary embodiment of the present invention. FIG. 2 illustrates a layout view of a common electrode panel for a LCD according to an exemplary embodiment of the present invention. FIG. 3 illustrates a layout view of a LCD including the thin film transistor array panel of FIG. 1 and the common electrode panel of FIG. 2. FIG. 4 and FIG. 5 illustrate cross-sectional views of the LCD taken along lines IV-IV and V-V of FIG. 3, respectively.

Referring to FIG. 4, the LCD according to an exemplary embodiment of the present invention includes a thin film transistor array panel 100 and a common electrode panel 200 that face each other and a liquid crystal layer 3 interposed between the thin film transistor array panel 100 and the common electrode panel 200.

The thin film transistor array panel 100 will now be described with reference to FIG. 1, FIG. 3, FIG. 4, and FIG. 5.

A plurality of gate lines 121 and a plurality of storage electrode lines 131 are arranged on an insulating substrate 110 that may be made of a transparent material. The transparent material may be glass or plastic.

Each gate line 121 transfers a gate signal and extends in a horizontal direction. Each gate line 121 includes a plurality of gate electrodes 124 that protrude upward and a wide end portion 129 for connecting to another layer or external driving circuit. A gate driving circuit (not shown) for generating the gate signals may be mounted on a flexible printed circuit film (not shown) attached to the substrate 110 or mounted directly on the substrate 110, or may be integrated on the substrate 110. If the gate driving circuit is integrated on the substrate 110, it may be directly connected to the gate lines 121.

The storage electrode lines 131 receive a predetermined voltage and have stem lines extending almost parallel to the gate lines 121; a plurality of first, second, third, and fourth storage electrode sets 133a, 133b, 133c, and 133d that branch off from the stem lines; and a plurality of connections 133e. Each storage electrode line 131 is disposed between two adjacent gate lines 121, and its respective stem line is arranged closer to the upper one of the two adjacent gate lines 121.

The first and the second storage electrodes 133a and 133b extend in a vertical direction and face each other. The first storage electrode 133a includes a fixed end connected to the stem line and a free end opposite to the fixed end, whereby the free end has a projection. The third and the fourth storage electrodes 133c and 133d extend obliquely from the center of the first storage electrode 133a to the lower and upper ends of the second storage electrode 133b, The connections 133e are connected between adjacent sets of the storage electrodes 133a to 133d. The shape and disposition of the storage electrode lines 131 may be variously changed.

The gate lines 121 and the storage electrode lines 131 may be made of aluminum (Al), silver (Ag), copper (Cu), molybdenum (Mo), and a low resistive conductor such as chromium (Cr), tantalum (Ta), and titanium (Ti), and the alloys thereof. The gate lines 121 and the storage electrode lines 131 may have a multilayer structure including two conductive layers (not shown) that have different physical properties from each other.

The sides of the gate lines 121 and storage electrode lines 131 incline toward the surface of the substrate 110 at an angle of about 30 to about 80 degrees.

A gate insulating layer 140, which may be made of silicon nitride ($SiN_x$) or silicon oxide ($SiO_x$), is formed on the gate lines 121, the storage electrode lines 131 and the substrate 110.

A plurality of semiconductor stripes 151, which may be made of hydrogenated amorphous silicon (a-Si) or polycrystalline silicon, are formed on the gate insulating layer 140. The semiconductor stripes 151 mainly extend in a vertical direction and have a plurality of projections 154 that protrude toward the gate electrodes 124.

A plurality of ohmic contact stripes and islands 161 and 165 are formed on the semiconductor stripes 151. The ohmic contacts 161 and 165 may be made of silicide or n+ hydrogenated amorphous silicon in which an n-type impurity, such as phosphorus, is highly doped. The ohmic contact stripes 161 have a plurality of projections 163, whereby the projections 163 and the ohmic contact islands 165 form pairs to be disposed on the projections 154 of the semiconductor stripes 151.

The sides of the semiconductor stripes 151, the ohmic contact strips 161 and the ohmic contact islands 165 also incline toward the surface of the substrate 110 at an angle of about 30 to about 80 degrees.

A plurality of data lines 171, a plurality of drain electrodes 175, and a plurality of isolated metal pieces 178 are formed on the ohmic contact stripes 161, the ohmic contact islands 165 and the gate insulating layer 140.

Each data line 171 transfers a data signal and extends in a vertical direction to cross the gate lines 121, the stem lines of the storage electrode lines 131, and the connections 133e. Each data line 171 includes a plurality of source electrodes 173 extending toward the gate electrodes 124 and a wide end portion 179 for connecting to another layer or an external driving circuit. A data driving circuit (not shown) for generating the data signals may be mounted on the flexible printed circuit film (not shown) attached to the substrate 110 or directly mounted on the substrate 110, or may be integrated on the substrate 110. If the data driving circuit is integrated on the substrate 110, the data lines 171 may extend to be directly connected to the data driving circuit.

The drain electrodes 175 are separated from the data lines 171 and face the source electrodes 173 on the projections 154 of the semiconductor stripes 151. Each drain electrode 175 has one wide end portion aid another rod-shaped end portion, whereby the rod-shaped end portion may be partially surrounded by the source electrode 173.

A gate electrode 124, a source electrode 173, and a drain electrode 175 form a thin film transistor (TFT) together with the projection 154 of the semiconductor stripe 151, and the channel of the TFT is formed in the projection 154 between the source electrode 173 and the drain electrode 175.

The isolated metal pieces 178 are disposed on the gate lines 121 around the first storage electrode 133a.

The data lines 171, the drain electrodes 175, and the isolated metal pieces 178, like the gate lines 121, may also be made of a low resistive conductor.

The sides of the data lines 171, the drain electrodes 175, and the isolated metal pieces 178 are also inclined toward the surface of the substrate 110 at an inclination angle of about 30 to about 80 degrees.

The ohmic contact stripes 161 and the ohmic contact islands 165 exist only between the semiconductor stripes 151 and the data lines 171 and drain electrodes 175 to reduce the resistance between them.

A passivation layer 180 is formed on the data lines 171, the drain electrodes 175, the isolated metal pieces 178, and exposed portions of the semiconductor stripes 151. The passivation layer 180 may be made of an inorganic insulating material or an organic insulating material, and its surface may be substantially flat. An example of the inorganic insulating material may be silicon nitride (SiNx) or silicon oxide (SiOx). The organic insulating material may have photosensitivity, and its dielectric constant may be less than about 4.0. However, the passivation layer 180 may have a double-layered structure including a lower inorganic layer and an upper organic layer, thereby utilizing the excellent insulating characteristic of an organic film and simultaneously preventing damage to the exposed portions of the semiconductors 154.

A plurality of pixel electrodes 191, a plurality of overpasses 83, and a plurality of contact assistants 81 and 82 are formed on the passivation layer 180. They may be made of a transparent conductive material such as ITO or IZO, or a reflective metal such as aluminum, silver, chromium, or an alloy thereof.

Each pixel electrode 191 is connected to a drain electrode 175 through a contact hole 185 and receives a data voltage from the drain electrode 175. Each pixel electrode 191 on which a data voltage is applied generates an electric field together with a common electrode 270 of another panel 200 on which a common voltage is applied to determine the direction of liquid crystal molecules in the liquid crystal layer 3 between the pixel electrode 191 and the common electrode 270. The polarization of light passing through the liquid crystal layer varies depending on the determined direction of the liquid crystal molecules. The pixel electrodes 191 and the common electrode 270 form capacitors (hereinafter, referred to as liquid crystal capacitors) to sustain the applied voltage even after the thin film transistor turns off.

The pixel electrodes 191 overlap with the storage electrodes 133a to 133d and the storage electrode lines 131. Capacitors formed by overlapping the pixel electrodes 191 and the drain electrodes 175, which are connected to the pixel electrodes 191, with the storage electrode lines 131 are called storage capacitors, whereby the storage capacitors enhance the voltage sustaining ability of the liquid crystal capacitors.

Each pixel electrode 191 has four main sides that run substantially parallel to the gate lines 121 or the data lines 171. Each pixel electrode 191 may have a quadrangle shape including four chamfered corners. The chamfered sides of the pixel electrodes 191 make an angle of about 45 degrees with the gate lines 121. A central cutout 91, a lower cutout 92a, and an upper cutout 92b are formed on each pixel electrode 191, and the pixel electrode 191 is divided into a plurality of partitions by these cutouts 91, 92a, and 92b. The cutouts 91, 92a, and 92b are almost inversely symmetrical with a virtual horizontal central line that halves the pixel electrode 191.

The lower and upper cutouts 92a and 92b extend obliquely from the right side of the pixel electrode 191 to the left side, and overlap with the third and fourth storage electrodes 133c and 133d, respectively. The lower and upper cutouts 92a and 92b are placed at lower and upper regions with the horizontal central line of the pixel electrode 191, respectively. The lower and upper cutouts 92a and 92b make an angle of about 45 degrees with the gate lines 121 and extend vertically to one another.

The central cutout 91 extends along the horizontal central line of the pixel electrode 191 and has an entrance at the right side. The entrance of the central cutout 91 has a pair of oblique sides each parallel to the lower cutout 92a and the upper cutout 92b. The central cutout 91 includes a horizontal section and a pair of oblique sections connected to the horizontal section. The horizontal section extends shortly along the horizontal central line of the pixel electrode 191. The pair of oblique sections extends from the horizontal section to the right side of the pixel electrode 191 to run parallel to the lower cutout 92a and the upper cutout 92b, respectively.

Therefore, the lower section of the pixel electrode 191 is divided into two regions by the lower cutout 92a, and the upper section of the pixel electrode 191 is also divided into two regions by the upper cutout 92b. Here, the number of regions or cutouts may vary with design factors such as the size of the pixel electrode 191, the length ratio of the horizontal and vertical sides of the pixel electrode 191, and the kind or characteristic of the liquid crystal layer 3.

The overpasses 83 are laid across the gate lines 121 and connected to the exposed portions of the storage electrode lines 131 and the exposed free ends of the storage electrodes 133b through the contact holes 183a and 183b disposed on opposite sides of the gate lines 121. The storage electrodes 133a and 133b and the storage electrode lines 131 may be used together with the overpasses 83 to correct defects of the gate lines 121, the data lines 171, or the thin film transistors.

The contact assistants 81 and 82 are connected to the end portion 129 of the gate line 121 and the end portion 179 of the data line 171 through contact holes 181 and 182, respectively. The contact assistants 81 and 82 supplement the connectivity of the end portion 129 of the gate line 121 and the end portion 179 of the data line 371 with an external device and protect them.

The common electrode panel 200 will now be described with reference to FIG. 2, FIG. 3, and FIG. 4.

A light blocking member 220 is formed on an insulating substrate 210 that may be made of a transparent material. The transparent material may be glass or plastic. The light blocking member 220 is also called a black matrix and prevents light leakage from between the pixel electrodes 191. The light blocking member 220 has a plurality of openings 225 that face the pixel electrodes 191 and have a similar shape to the pixel electrodes 191. The light blocking member 220 may have one portion corresponding to the gate lines 121 and the data lines 171 and another portion corresponding to the thin film transistor.

A plurality of color filters 230 may be formed on the substrate 210. The color filters 230 are primarily placed in the region surrounded by the light blocking member 220 and may extend along the column of the pixel electrodes 191 in a vertical direction. Each color filter 230 may display one primary color, such as red, green, or blue.

An overcoat 250 is formed on the color filters 230 and the light blocking member 220. The overcoat 250, which may be made of an (organic) insulating material, prevents the color filters 230 from being exposed and provides a substantially flat surface. The overcoat 250 may be omitted.

A common electrode 270 is formed on the overcoat 250. The common electrode 270 may be made of a transparent conductor such as ITO or IZO. A plurality of cutouts 71, 72a, and 72b are formed in the common electrode 270.

One set of cutouts 71, 72a, and 72b faces one pixel electrode 191 and includes a central cutout 71, a lower cutout 72a, and an upper cutout 72b. Each cutout 71, 72a, and 72b is disposed between the adjacent cutouts 91, 92a, and 92b of the pixel electrode 191 or between the cutouts 92a and 92b and the chamfered sides of the pixel electrode 191. Each cutout 71, 71a, and 72b includes at least one oblique section extending to run parallel to the lower cutout 92a or the upper cutout 92b of the pixel electrode 191. The cutouts 71, 72a, and 72b are almost inversely symmetrical with the horizontal central line of the pixel electrode 191.

The lower and upper cutouts 72a and 72b each include an oblique section, a horizontal section, and a vertical section. The oblique section extends basically from the upper or lower side of the pixel electrode 191 to the left side. The horizontal and vertical sections extend along the sides of the pixel electrode 191 to overlap with the sides and make an obtuse angle with the oblique section.

The central cutout 71 includes a central horizontal section, a pair of oblique sections, and a pair of end vertical sections. The central horizontal section extends basically from the left side of the pixel electrode 191 to the right along the horizontal central line of the pixel electrode 191. The pair of oblique sections extends from the end of the central horizontal section to the right side of the pixel electrode 191 to make an obtuse angle with the central horizontal section and run parallel to the lower and upper cutouts 72a and 72b, respectively. The end vertical section extends from the end of the corresponding oblique section to the right along the right side of the pixel electrode 191 to overlap with the right side and makes an obtuse angle with the corresponding oblique section.

The number of cutouts 71, 72a, and 72b may vary with the design factors. The light blocking member 220 overlaps with the cutouts 71, 72a, and 72b to block light leakage around the cutouts 71, 72a, and 72b.

Applying a common voltage to the common electrode 270 and a data voltage is applied to the pixel electrode 191 generates an electric field that is almost vertical to the surface is of the display panels 100 and 200. In response to the electric field, liquid crystal molecules 310 tend to change the direction of their major axis to be vertical to the direction of the electric field.

The cutouts 71, 72a, 72b, 91, 92a, and 92b of the field generating electrodes 191 and 270 and the sides of the pixel electrode 191 make a horizontal component that changes the electric field to determine the inclined direction of the liquid crystal molecules 310. The horizontal component of the electric field is almost vertical to the sides of the cutouts 71, 72a, 72b, 91, 92a, and 92b and the pixel electrode 191.

Referring to FIG. 3, one set of cutouts 71, 72a, 72b, 91, 92a, and 92b divides the pixel electrode 191 into a plurality of sub-areas, and each sub-area has two primary sides that make an oblique angle with the primary sides of the pixel electrode 191. The primary sides of each sub-region make an angle of about 45 degrees with the polarization axes of the polarizers 12 and 22 in order to maximize light efficiency.

Most of the liquid crystal molecules 310 on the sub-areas incline in a direction vertical to the primary edges. There are approximately four inclined directions. When the inclined directions of the liquid crystal molecules 310 are diversified, the standard viewing angle of the liquid crystal display becomes larger.

The shape and disposition of the cutouts 71, 72a, 72b, 91, 92a, and 92b may be variously changed.

At least one of the cutouts 71, 72a, 72b, 91, 92a, and 92b may be replaced with a protrusion (not shown) or a depression (not shown). The protrusion may be made of an organic material or an inorganic material and disposed on or under the field generating electrodes 191 and 270.

Alignment layers 11 and 21 are coated on inner surfaces of the display panels 100 and 200 and may be vertical alignment layers.

Polarizers 12 and 22 are provided on outer surfaces of the display panels 100 and 200, and their polarization axes (X, Y) are perpendicular to each other and preferably make an angle of about 45 degrees with the oblique sections of the cutouts 92a, 92b, 71, 72a, and 72b. In the case of a reflective liquid crystal display, one of the two polarizers 12 and 22 may be omitted.

The LCD according to an exemplary embodiment of the present invention may further include a phase retardation film (not shown) for compensating for the delay of the liquid crystal layer 3. Also, the LCD may further include a backlight unit (not shown) for providing the polarizers 12 and 22, phase retardation film, display panels 100 and 200, and liquid crystal layer 3 with light.

The liquid crystal layer 3 has negative dielectric anisotropy, and the major axis of the liquid crystal molecules 310 of the liquid crystal layer 3 are aligned to be almost vertical to the surface of the display panels 100 and 200 with no electric field generated. Therefore, incident light cannot pass the crossed polarizers 12 and 22 and is blocked.

The liquid crystal layer 3, as described above, may be composed of a liquid crystal composition including a fluorine-containing compound with dielectric anisotropy and a neutral compound without dielectric anisotropy.

The fluorine-containing compound may include a compound represented by chemical formula (I)

(I)

Herein, at least one of $W_1$ and $W_2$ includes a fluorine atom, and each of A and B includes at least one compound selected from the group consisting of a chain or ring alkyl group and a chain or ring alkoxy group.

For example, the chemical formula (I) may be represented by the following chemical formula (VI)

(VI)

Herein, each of $W_1$ and $W_2$ is one selected from the group consisting of —F, —$CF_3$, —$CF_2H$, —$OCF_3$, and —$OCF_2H$, independently. Each of $R_7$ and $R_8$ is one selected from the group consisting of a hydrogen atom and an alkyl group or an alkoxy group having $C_1$ to $C_{12}$, independently. Each of $A_1$, $A_2$, $B_1$, and $B_2$ is one selected from the group consisting of trans-1,4-cyclohexylene, 1,4-phenylene, 1,4-cyclohexenylene, 1,4-bicyclo[2,2,2]ocetylene, piperidine-1,4-diyl, naphthalene-2,6-diyl, decahydronaphthalene-2,6-diyl, and 1,2,3,4-tetrahydronaphthalene-2,6-diyl, independently. Each of $Z_1$, $Z_2$, $Z_3$, and $Z_4$ is one selected from the group consisting of —$CH_2CH_2$—, —CH=CH—, —$CH(CH_3)CH_2$—, —CH$_2$CH(CH$_3$)—, —CH(CH$_3$)CH(CH$_3$), —CF$_2$CF$_2$—, —CF═CF—, CH$_2$O—, —OCH$_2$—, —OCH(CH$_3$)—, —CH(CH$_3$)O—, —(CH$_2$)$_4$—, —(CH$_2$)$_3$O—, —O(CH$_2$)$_3$—, CF$_2$O—, —OCF$_2$—, —COO—, and —OCO—, independently. Each of a, b, c, and d is an integer of 0 or 1, independently.

The liquid crystal composition may include about 20 to about 80 wt % of the fluorine-containing compound.

The neutral compound may include at least one compound selected from the compounds represented by chemical formulas (III), (IV), and (V)

Herein, each of R$_1$ to R$_6$ may be the same or different from one another, and may include an alkyl group or an alkoxy group having C$_1$ to C$_5$.

More preferably, each of R$_1$ to R$_6$ does not include an alkenyl group. If at least one of R$_1$ to R$_6$ includes an alkenyl group, the liquid crystal composition should include less than about 7 wt % of the neutral compound having the alkenyl group at the terminal group.

Otherwise, the liquid crystal composition may include about 20 to about 80 wt % of the neutral compound.

The liquid crystal composition according to an exemplary embodiment of the present invention may not include a neutral compound having an alkenyl group at the terminal group. Even if the liquid crystal composition included the neutral compound having an alkenyl group, the liquid crystal composition would be limited to less than about 7 wt % of the neutral compound having an alkenyl group at the terminal group.

As described above, by limiting the content of a neutral compound that has an alkenyl group at the terminal group in the liquid crystal composition, it is possible to improve the line residual image characteristic and to simultaneously maintain physical characteristics such as dielectric anisotropy, refractive anisotropy, and rotation viscosity.

Although only a vertical alignment (VA) mode LCD has been described in the present exemplary embodiment, it is apparent that the present invention can be applied identically to a horizontal alignment mode LCD, such as a twist nematic (TN) or in-phase switching (IPS) mode LCD.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal composition, comprising:
a first class comprising a fluorine-containing compound represented by chemical formula (I), and a second class comprising a first sub-class and a second sub-class, each of the first sub-class and the second sub-class comprising at least one of neutral liquid crystal compounds represented by chemical formula (III), chemical formula (IV), and chemical formula (V), wherein:
each of W$_1$ and W$_2$ is a hydrogen atom or a fluorine atom, independently and at least one of W$_1$ and W$_2$ comprises a fluorine atom;
each of A and B comprises at least one selected from the group consisting of a chain or ring alkyl group and a chain or ring alkoxy group; and
the neutral liquid crystal compounds represented by chemical formula (III), chemical formula (IV), and chemical formula (V) comprise R$_1$ to R$_6$ as terminal groups, wherein each of R$_1$ to R$_6$ is one of a C$_1$ to C$_{12}$ alkyl group, alkoxy group, and alkenyl group;
wherein the at least one neutral liquid crystal compound of the first sub-class does not have an alkenyl group as either terminal group thereof, and the at least one neutral liquid crystal compound of the second sub-class has an alkenyl group as a terminal group thereof, the second sub-class being contained at less than 7 wt % of the total content of the first and second classes, and
wherein:
the first class further comprises a fluorine-containing compound represented by chemical formula (II);

wherein:
each of W$_1$, W$_2$, and W$_3$ is a hydrogen atom or a fluorine atom, independently and at least one of W$_1$, W$_2$, and W$_3$ comprises a fluorine atom; and each of C and D comprises at least one selected from the group consisting of a chain or ring alkyl group and a chain or ring alkoxy group.

2. The liquid crystal composition of claim 1, wherein the chemical formula (I) is represented by chemical formula (VI), (VI)

wherein:
each of $W_1$ and $W_2$ is a hydrogen atom or a fluorine atom, independently and at least one of $W_1$ and $W_2$ comprises a fluorine atom;
each of $R_7$ and $R_8$ is an alkyl group or alkoxy group having $C_1$ to $C_{12}$, independently;
each of $A_1$, $A_2$, $B_1$, and $B_2$ is one selected from the group consisting of trans-1,4-cyclohexylene, 1,4-phenylene, 1,4-cyclohexenylene, 1,4-bicyclo[2,2,2]ocetylene, piperidine-1,4-diyl, naphthalene-2,6-diyl, decahydronaphthalene-2,6-diyl, and 1,2,3,4-tetrahydronaphthalene-2,6-diyl, independently;
each of $Z_1$, $Z_2$, $Z_3$, and $Z_4$ is one selected from the group consisting of —$CH_2CH_2$—, —CH=CH—, —CH($CH_3$)$CH_2$—, —$CH_2$CH($CH_3$)—, —CH($CH_3$)CH($CH_3$), —$CF_2CF_2$—, —CF=CF—, $CH_2$O—, —$OCH_2$—, —OCH($CH_3$)—, —CH($CH_3$)O—, —($CH_2$)$_4$—, —($CH_2$)$_3$O—, —O($CH_2$)$_3$—, $CF_2$O—, —$OCF_2$—, —COO—, and —OCO—, independently; and
each of a, b, c, and d is an integer of 0 or 1, independently.

3. The liquid crystal composition of claim 1, wherein the chemical formula (II) is represented by the following chemical formula (VII), (VII)

wherein:
each of $W_1$, $W_2$, and $W_3$ is one selected from the group consisting of —F, —$CF_3$, —$CF_2$H, —$OCF_3$, and —$OCF_2$H, independently;
each of $R_9$ and $R_{10}$ is an alkyl group or alkoxy group having $C_1$ to $C_{12}$, independently;
each of $C_1$, $C_2$, $D_1$, and $D_2$ is one selected from the group consisting of trans-1,4-cyclohexylene, 1,4-phenylene, 1,4-cyclohexenylene, 1,4-bicyclo[2,2,2]ocetylene, piperidine-1,4-diyl, naphthalene-2,6-diyl, decahydronaphthalene-2,6-diyl, and 1,2,3,4-tetrahydronaphthalene-2,6-diyl, independently;
each of $Z_5$, $Z_6$, $Z_7$, and $Z_8$ is one selected from the group consisting of —$CH_2CH_2$—, —CH=CH—, —CH($CH_3$)$CH_2$—, —$CH_2$CH($CH_3$)—, —CH($CH_3$)CH($CH_3$), —$CF_2CF_2$—, —CF=CF—, $CH_2$O—, —$OCH_2$—, —OCH($CH_3$)—, —CH($CH_3$)O—, —($CH_2$)$_4$—, —($CH_2$)$_3$O—, —O($CH_2$)$_3$—, $CF_2$O—, —$OCF_2$—, —COO—, and —OCO—, independently; and
each of e, f, g, and h is an integer of 0 or 1, independently.

4. The liquid crystal composition of claim 3, wherein the liquid crystal composition comprises about 20 to about 80 wt % of each of the first class and the second class.

5. The liquid crystal composition of claim 1, wherein the liquid crystal composition comprises about 5 to about 40 wt % of a liquid crystal compound represented by the chemical formula (I); and less than about 40 wt % of a liquid crystal compound represented by the chemical formula (II).

6. The liquid crystal composition of claim 5, wherein the liquid crystal composition comprises:
about 10 to about 45 wt % of a liquid crystal compound represented by the chemical formula (III);
about 10 to about 45 wt % of a liquid crystal compound represented by the chemical formula (IV); and
less than about 20 wt % of a liquid crystal compound represented by the chemical formula (V).

7. The liquid crystal composition of claim 1, wherein the liquid crystal composition does not comprise the second subclass.

8. The liquid crystal composition of claim 1, wherein the second class further comprises at least one of the compounds represented by chemical formula (VIII) and chemical formula (IX),

(VIII)

(IX)

wherein each of $R_{11}$, $R_{12}$, $R_{13}$, and $R_{14}$ is one selected from the group consisting of a hydrogen atom and an alkyl group or an alkoxy group having and $C_1$ to $C_{12}$, independently.

9. A liquid crystal display, comprising:
a first substrate;
a second substrate facing the first substrate;
a pair of field generating electrodes arranged on at least one of the first substrate and the second substrate; and
a liquid crystal layer interposed between the first substrate and the second substrate,
wherein the liquid crystal layer comprises a liquid crystal composition, the liquid crystal composition comprising:
a first class comprising a fluorine-containing compound represented by the following chemical formula (I), and (I)

a second class comprising a first sub-class and a second sub-class, each of the first sub-class and the second sub-class comprising at least one of neutral liquid crystal compounds represented by chemical formula (III), chemical formula (IV), and chemical formula (V), (III)

(IV)

(V)

wherein each of $W_1$ and $W_2$ is a hydrogen atom or a fluorine atom, independently and at least one of $W_1$ and $W_2$ comprises a fluorine atom; and each of A and B comprises at least one selected from the group consisting of a chain or ring alkyl group and a chain or ring alkoxy group, the neutral liquid crystal compounds represented by the chemical formula (III), the chemical formula (IV), and the chemical formula (V) comprise $R_1$ to $R_6$ as terminal groups, wherein each of $R_1$ to $R_6$ is one of a $C_1$ to $C_{12}$ alkyl group, alkoxy group, and alkenyl group, and wherein the at least one neutral liquid crystal compound of the first sub-class does not have an alkenyl group as either terminal group thereof, and the at least one neutral liquid crystal compound of the second sub-class has an alkenyl group as a terminal group thereof, the second sub-class being contained at less than 7 wt % of the total content of the first and second classes, and wherein:

the first class further comprises a fluorine-containing compound represented by chemical formula (II);

(II)

each of $W_1$, $W_2$, and $W_3$ is a hydrogen atom or a fluorine atom, independently and at least one of $W_1$, $W_2$, and $W_3$ comprises a fluorine atom; and each of C and D comprises at least one selected from the group consisting of a chain or ring alkyl group and a chain or ring alkoxy group.

10. The liquid crystal display of claim 9, wherein the chemical formula (I) is represented by chemical formula (VI), (VI)

wherein:

each of $W_1$ and $W_2$ is a hydrogen atom or a fluorine atom, independently and at least one of $W_1$ and $W_2$ comprises a fluorine atom;

each of $R_7$ and $R_8$ an alkyl group or an alkoxy group having $C_1$ to $C_{12}$, independently;

each of $A_1$, $A_2$, $B_1$, and $B_2$ is one selected from the group consisting of trans-1,4-cyclohexylene, 1,4-phenylene, 1,4-cyclohexenylene, 1,4-bicyclo[2,2,2]ocetylene, piperidine-1,4-diyl, naphthalene-2,6-diyl, decahydronaphthalene-2,6-diyl, and 1,2,3,4-tetrahydronaphthalene-2,6-diyl, independently;

each of $Z_1$, $Z_2$, $Z_3$, and $Z_4$ is one selected from a group consisting of —$CH_2CH_2$—, —CH=CH—, —CH($CH_3$)$CH_2$—, —$CH_2$CH($CH_3$)—, —CH($CH_3$)CH($CH_3$), —$CF_2CF_2$—, —CF=CF—, $CH_2$O—, —$OCH_2$—, —OCH($CH_3$)—, —CH($CH_3$)O—, —($CH_2$)$_4$—, —($CH_2$)$_3$O—, —O($CH_2$)$_3$—, $CF_2$O—, —$OCF_2$—, —COO—, and —OCO—, independently; and each of a, b, c, and d is an integer of 0 or 1, independently.

11. The liquid crystal display of claim 9, wherein the chemical formula (II) is represented by chemical formula (VII), (VII)

wherein:

each of $W_1$, $W_2$, and $W_3$ is one selected from the group consisting of —F, —$CF_3$, —$CF_2$H, —$OCF_3$, and —$OCF_2$H, independently;

each of $R_9$ and $R_{10}$ is an alkyl group or an alkoxy group having $C_1$ to $C_{12}$, independently;

each of $C_1$, $C_2$, $D_1$, and $D_2$ is one selected from a group consisting of trans-1,4-cyclohexylene, 1,4-phenylene, 1,4-cyclohexenylene, 1,4-bicyclo[2,2,2]ocetylene, piperidine-1,4-diyl, naphthalene-2,6-diyl, decahydronaphthalene-2,6-diyl, and 1,2,3,4-tetrahydronaphthalene-2,6-diyl, independently;

each of $Z_5$, $Z_6$, $Z_7$, and $Z_8$ is one selected from the group consisting of —$CH_2CH_2$—, —CH=CH—, —CH($CH_3$)$CH_2$—, —$CH_2$CH($CH_3$)—, —CH($CH_3$)CH($CH_3$), —$CF_2CF_2$—, —CF=CF—, $CH_2$O—, —$OCH_2$—, —OCH($CH_3$)—, —CH($CH_3$)O—, —($CH_2$)$_4$—, —($CH_2$)$_3$O—, —O($CH_2$)$_3$—, $CF_2$O—, —$OCF_2$—, —COO—, and —OCO—, independently; and each of e, f, g, and h is an integer of 0 or 1, independently.

12. The liquid crystal display of claim 9, wherein the liquid crystal composition does not comprise the second sub-class.

13. The liquid crystal display of claim 9, further comprising an inclination direction determining member for determining the inclination direction of the neutral liquid crystal compound of the liquid crystal layer.

14. The liquid crystal display of claim 13, wherein the inclination direction determining member comprises a cutout arranged in the field generating electrodes and a protrusion arranged on the field generating electrodes.

* * * * *